US011558940B2

(12) United States Patent
Chen et al.

(10) Patent No.: US 11,558,940 B2
(45) Date of Patent: Jan. 17, 2023

(54) INTELLIGENT LIGHTING CONTROL SYSTEM

(71) Applicant: VITEC VIDEOCOM INC., Chatsworth, CA (US)

(72) Inventors: Victor Hau Chen, Marina Del Rey, CA (US); Richard Allen Rosen, Simi Valley, CA (US)

( * ) Notice: Subject to any disclaimer, the term of this patent is extended or adjusted under 35 U.S.C. 154(b) by 487 days.

(21) Appl. No.: 15/489,477

(22) Filed: Apr. 17, 2017

(65) Prior Publication Data

US 2017/0354014 A1 Dec. 7, 2017

Related U.S. Application Data

(60) Provisional application No. 62/323,577, filed on Apr. 15, 2016.

(51) Int. Cl.
*H05B 45/24* (2020.01)
*H05B 47/19* (2020.01)
*H05B 47/125* (2020.01)
*H05B 45/12* (2020.01)

(52) U.S. Cl.
CPC ............ *H05B 45/24* (2020.01); *H05B 45/12* (2020.01); *H05B 47/125* (2020.01); *H05B 47/19* (2020.01); *Y02B 20/40* (2013.01)

(58) Field of Classification Search
CPC .................. H05B 33/0866; H05B 33/0845
USPC ........................................... 315/150
See application file for complete search history.

(56) References Cited

U.S. PATENT DOCUMENTS

| | | | | |
|---|---|---|---|---|
| 9,198,252 | B2 * | 11/2015 | Laski | H05B 33/0854 |
| 9,854,650 | B2 * | 12/2017 | Kim | H05B 37/0272 |
| 2013/0271004 | A1 * | 10/2013 | Min | H05B 33/0842 |
| | | | | 315/112 |
| 2014/0320024 | A1 * | 10/2014 | Adler | F21S 2/00 |
| | | | | 315/153 |
| 2015/0084514 | A1 * | 3/2015 | Anthony | H05B 33/0863 |
| | | | | 315/131 |
| 2015/0302609 | A1 * | 10/2015 | Rotella | G06T 7/408 |
| | | | | 348/135 |
| 2016/0286627 | A1 * | 9/2016 | Chen | H05B 37/0245 |
| 2017/0135176 | A1 * | 5/2017 | Soler | H05B 33/0866 |
| 2017/0367164 | A1 * | 12/2017 | Engelen | H05B 37/0272 |

* cited by examiner

*Primary Examiner* — Dylan C White
(74) *Attorney, Agent, or Firm* — Scott R. Zingerman; GableGotwals

(57) ABSTRACT

A system includes a mobile computing device with an image sensor that wirelessly controls at least one lighting fixture to maintain a predetermined color and intensity based on light detected by the image sensor.

17 Claims, 4 Drawing Sheets

INTELLIGENT LIGHTING CONTROL SYSTEM

CROSS-REFERENCE TO RELATED CASES

This application claims the benefit of U.S. provisional patent application Ser. No. 62/323,577, filed on Apr. 15, 2016, and incorporates such provisional application by reference into this disclosure as if fully set out at this point.

FIELD OF THE INVENTION

This disclosure relates to lighting for photography and video in general and, more particularly, to adjustable light emitting diode lighting systems.

BACKGROUND OF THE INVENTION

Lighting is inherently very subjective due to the difference in an individual's perception of light. However, digital image/video capture is a very objective collection of pixel information. The effect of lighting on digital image/video can thus also be determined objectively and adjusted systematically.

In a given environment, when viewed from any particular point of view (e.g., from a particular camera angle) there is a color balance resultant from the ambient light and objects in the environment. If artificial lighting is introduced, the color balance of the artificial lighting may not match that of the ambient environment. This can result in artifacts or imbalances that have what would be considered an undesirable appearance. These may include differing light or color balance on one side of an object relative to another, imbalances from background to foreground, or other undesirable imbalances. It may be possible to correct some of the imbalances in post-production or via digital editing techniques, but this can be difficult if it can be done it all and it is always time consuming.

Even if the color balance of the artificial lighting is made to match the scene and environment perfectly, the scene or environment may not remain static. Oftentimes, video or images are captured where there is at least some natural light. Natural light is frequently not a static phenomena, even over relatively short periods of time. For example, light changes rapidly at sunrise or sunset. Even during the middle of the day, cloud cover and other environmental factors can change the appearance of ambient lighting.

The appearance of a scene can also change, both in terms of lighting intensity and color balance, depending upon which way the camera is facing. If a camera is static, this may not be an issue. On the other hand, varying camera angles are often desirable even in the same scene. Similarly, in the event a camera is mobile (e.g., mounted on a trolley or handheld) the color balance as seen from the camera may change quite dramatically over time.

What is needed is a system and method for addressing the above, and related, issues.

SUMMARY OF THE INVENTION

The invention of the present disclosure, in one aspect thereof, comprises a system including a mobile computing device having a communicatively coupled image sensor, and at least one lighting fixture electronically controlled by the mobile computing device. The mobile computing device alters color output of the at least one light fixture to match a color balance corresponding to a scene as detected by the image sensor.

In some embodiments, the mobile computing device detects changes in the color balance corresponding to the scene and adjusts the color output of the at least one light fixture in real-time. The at least one lighting fixture may comprise at least two lighting fixtures with each being separately controllable in real-time by the mobile computing device with regard to at least color output and intensity.

The mobile computing device controls the at least one lighting fixture wirelessly, and the at least one lighting fixture may comprise a mobile light emitting diode panel. In some embodiments, the mobile computing device comprises a mobile telephone.

The invention of the present disclosure, in another aspect thereof, comprises a system including a mobile computing device having an image sensor, and a processor communicatively coupled to the image sensor that computes tristimulus values from RGB values obtained from the image sensor. The system includes a lighting fixture capable of producing a specified intensity and color of light. The processor specifies in real-time a color of light to be emitted by the lighting fixture to match the computed tristimulus values.

In some embodiments, the mobile computing device and the lighting fixture are in wireless communication for specification of the color of light to be emitted. The processor may detect changes in color balance of a scene monitored by the image sensor in real-time and then update the color of light to be emitted and transmit the updated color to the lighting fixture in real-time. Some embodiments of the system include at least one additional lighting fixture producing a second specified color of light, and which is in communication with the mobile computing device for receipt of the second specified color. The first and second specified colors differ.

The lighting fixtures comprise panels of multiple light emitting diodes in some embodiments. In other embodiments, the lighting fixtures comprise Fresnel lights. The mobile computing device comprises a mobile telephone.

The invention of the present disclosure, in another aspect thereof, comprises a method including utilizing a mobile computing device having an image sensor to determine a light balance of a scene, providing at least one lighting fixture capable of providing a variable color light output to direct output light toward the scene, and instructing the at least one lighting fixture to provide a specified color of light corresponding to the light balance of the scene.

The method may include detecting changes in light balance of the scene and updating the instructions to the at least one lighting fixture in real-time. The method may further comprise instructing at least one additional lighting fixture to provide a second specified color of light. The lighting fixtures may be instructed wirelessly.

DETAILED DESCRIPTION OF THE PREFERRED EMBODIMENTS

The present disclosure, in various embodiments, provides a wireless remote control and real-time color control for lighting systems. In some embodiments, the system comprises one or more electronically controllable lights. These may be light emitting diode (LED) based systems such as those available from Litepanels or Manfrotto. The system may include a mobile computing device with integrated camera and Bluetooth® connection ability. Such a device may comprise an iOS device from Apple, an Android device, or another suitable device having a camera, Bluetooth connectivity, and being capable of running third party applications. The present system relies on an installed application (or "app") to control various light sensing and light control functions as described herein. Various embodiments of the present system rely on the mobile device's camera and methods of interpretation of the camera's data to provide real-time continuous feedback to the control of the lights.

Various systems disclosed herein provide real-time feedback and real-time corrective adjustments. For purposes of the present disclosure real-time feedback means that the system can take into account changes in color balance and intensity of the scene before the camera as they occur, even if initial setup and shooting has begun. Importantly, changes in color balance and intensity of light from the associated lighting fixtures can also occur automatically as shooting is occurring.

One exemplary benefit of the systems of the present disclosure is increased speed of initial setup of the lighting on the set, stage, or studio due to the instant and automated adjustments of the light's color, intensity and other parameters. The system reduces a large part of the time consuming manual labor and costly and subjective personnel time involved in traditional lighting setup. It automatically creates an objective lighting scene benchmark while still allowing for individual subjective adjustability afterwards to suit the application. Further, the system provides the ability to recognize changing environments and automatically provide real-time changes to the light fixture or fixtures parameters. Real-time feedback and corrective adjustments may be made to the color balance and brightness (and other parameters) of the emitting light or lights.

Figure 1:
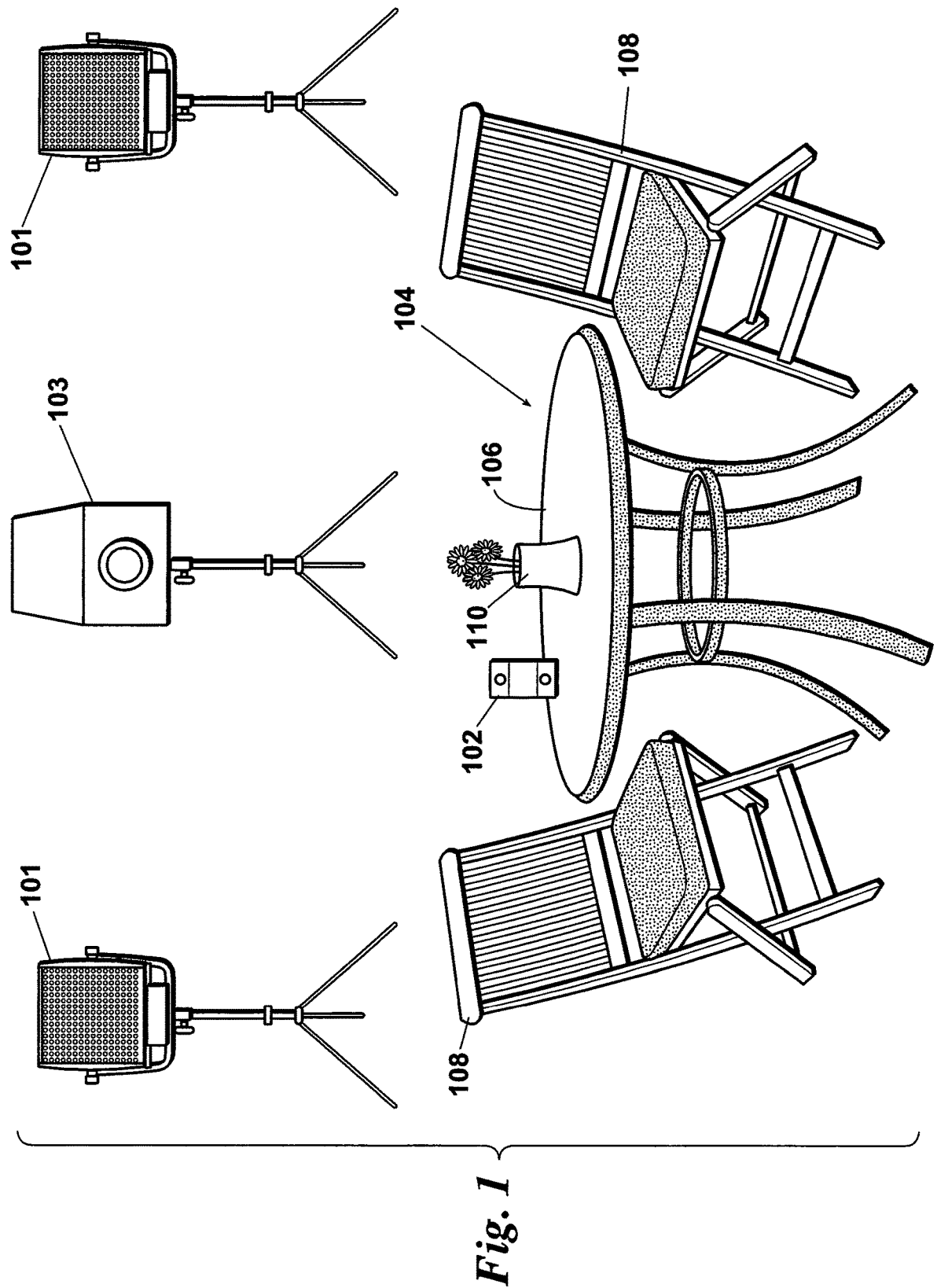
FIG. 1 is a perspective environmental diagram of an intelligent lighting control system according to aspects of the present disclosure.

Referring now to FIG. 1, in some embodiments, the system 100 comprises multiple adjustable LED lighting fixtures 101 that have the ability to connect to a mobile computing device. The system 100 may be operable with a wide variety of remote electronically controllable lighting fixtures. Two examples of suitable lighting fixtures 101 are the Litepanels® Astra family of fixtures available from Vitec Videocom, Inc., and the Manfrotto™ Lykos family of fixtures available from Manfrotto Distribution Inc. These fixtures 101 may be controlled wirelessly via the Bluetooth protocol. In other embodiments, light fixtures 101 are controlled by WiFi (e.g., 801.11x), or by a DMX controller or DMX wireless bridge. Further, in some embodiments, the lighting fixtures 101 may comprise a Fresnel light having the requisite control over color of light emitted in order to be useful with the systems of the present disclosure.

A camera 103 may be used to capture a scene 104. The camera 103 may be a video or still camera as is known in the art. The camera 103 may capture video or still images of a combination thereof. The scene 104 may be a set scene (e.g., on a movie set) or may be whatever scene the subject or person of interest happens to occupy, whether indoors or out or whether natural ambient lighting can be considered ahead of time or not.

For purposes of illustration, the same scene 104 is used throughout the present disclosure. Here the scene 104 includes a table 106 and two chairs 108. A flower vase 110 occupies the table 106. Hence the scene 104 is exemplary of that which might be part of a set for a movie, or that might be encountered in an on-sight shoot at a café or on a sidewalk. During shooting, subjects (e.g., such as people, not shown) may occupy the scene 104 in front of the camera 103. Subjects entering of leaving a scene may have an impact on the color balance or other properties of the light detected by the camera 103. Systems of the present disclosure can detect and compensate for these effects in real-time as well.

In order to capture information regarding lighting conditions with respect to the scene 104, a mobile computing device 102 may be deployed. The mobile computing device 102 may be a phone or tablet using the iOS or Android operating systems. Other mobile computing devices may be utilized within the system 100 so long as they have access to or include a digital image capture device, image processing capability, computation capability, ability to run third party applications, and remote connectivity capability. The present system 100 utilizes Bluetooth 4.1 technology but other protocols may be used as well. Additional protocols that might be deployed include, but are not limited to, Wi-Fi and Wireless DMX.

The system 100, via programming of the mobile computing device 102 or an app, performs automated and intelligent control of intensity and color balance of the light fixtures 101. Real-time and continuous adjustments are made by the mobile device 102 based on internal sensor feedback (e.g., the mobile device's built-in camera) and/or the camera 103.

Communication between the light fixtures 101 and the mobile computing device 102 may be bidirectional. Control characteristics (depending on the amount of adjustment available in the light fixtures 101) are sent from the mobile device 102 to the light fixtures 101 and fixture information (sensor data, feedback, fixture monitoring data, positioning data) is sent from the light fixture 101 to the mobile device 102.

Figure 2:
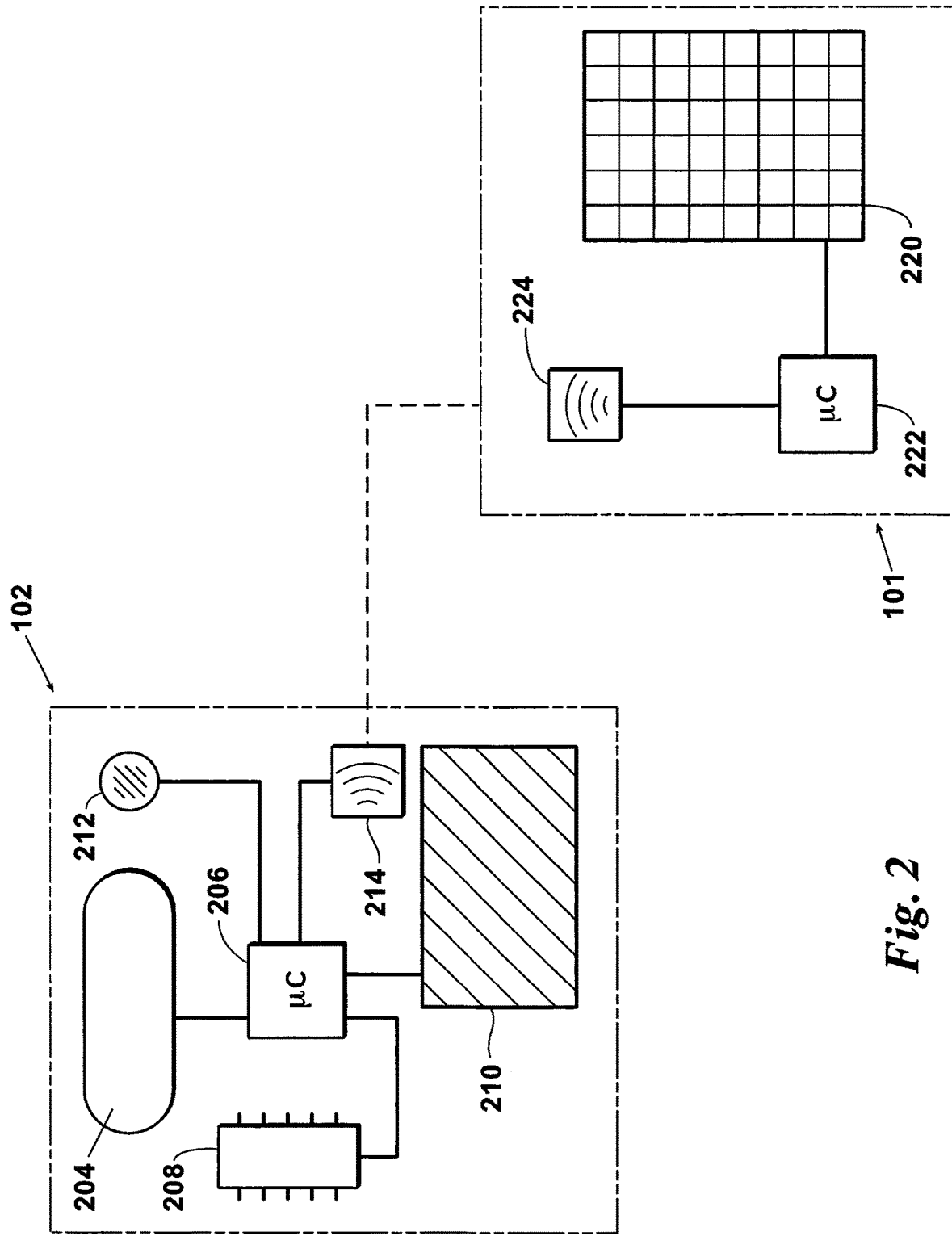
FIG. 2 is a schematic diagram of a mobile computing device in communication with a lighting fixture as part of an intelligent light control system according to aspects of the present disclosure.

Referring now to FIG. 2 a schematic diagram of the mobile computing device 102 in communication with a lighting fixture 101 as part of an intelligent light control system according to aspects of the present disclosure is shown. FIG. 2 is intended to provide additional detail with regard to the hardware deployed as a part of the mobile computing deice 102 and lighting fixtures 101. The mobile computer device 102 (as has been described) may be a mobile telephone. As is known in the art, a case 202 generally contains all of the associated componentry of the device 101 in a compact easily portable package. A battery 204 is also provided such that constant access to power is not required.

Mobile devices today typically have a microprocessor 206 that is general-purpose in that it can be programmed with advanced languages to substantially extend the capabilities of the mobile computing device 102 beyond its basic purpose and programming. Onboard memory 208 is provided for retaining instructions and data captured. On modern mobile computing devices, a touchscreen 210 may be the standard I/O mechanism. An on board camera 212 may be capable of capturing both still and video images. The camera 212 is communicatively coupled to the microprocessor 206 such that the microprocessor may have access to a substantial amount of data regarding the scene that is placed before the camera 212. In other words, the camera 212 and microprocessor 206 combination can be programmed to provide extended capabilities beyond just capturing images or video, thereby making them useful as components of systems of the present disclosure.

Most mobile computing devices provide support for multiple wireless protocols. In some embodiments, these capabilities are provided by one or more wireless communication chips 214. The chip 214 may provide Bluetooth, WiFi, or support for other protocols. It is also understood that the mobile device 102 may be built from a system-on-a-chip architecture such that multiple functions are provided on the same physical silicon component (e.g., processing, memory, and/or wireless communication). The present disclosure is not intended to be limited to any such specific configuration.

Simplistically represented, the lighting fixture 101 may provide a light panel 220 that is controlled by a microcontroller 222. The microcontroller 222 may be communicatively coupled to a wireless chip 224 (or it could be part of a system-on-a-chip). Via the wireless chips 214, 224, the mobile computing device 102 may be in two-way communication with one or more lighting fixtures 101. In embodiments deploying Fresnel lenses, possibly utilizing an incandescent light source, an actual light panel 220 may not be present.

An image capture device (e.g., a CMOS sensor, part of the mobile device's built in camera 212) associated with the mobile computing device 102 is used to determine ambient room or environmental lighting parameters including color and brightness. The display 210 associated with the mobile device 102 can act as a visual feedback component of the system. The display 210 may also be utilized to provide input or control of systems of the present disclosure (e.g., in the case of a mobile device equipped with a touch screen).

Color detection reference may be empirically derived by correlating the RGB (red, green, blue) sensor levels of the array of pixels captured by the image capture device 212 to the tristimulus values as would be measured by a standardized color meter. The derived correlation relies on the image capture device parameters and processing characteristics (sensor responsivity, sensor array size, exposure, timing, white balance, hue cast, aperture, focus, etc.). The correlation can then be used to compute various meaningful color lighting characteristics and transforms (i.e. CIE 1931, CIE L*u*v, CIE L*a*b*, color temperatures, etc.). The correlation between known lighting sources and a known image capture device results in precision up to +/− 50 degrees Kelvin. In another embodiment, precision is up to +/− 20 degrees Kelvin. In another embodiment, precision is up to +/− 10 degrees Kelvin.

Since there may be a wide variety of sensor sizes and types employed in various mobile computing devices, the installed software is configured to utilize the correct transform for the sensor deployed (e.g., within or as a part of the mobile computing device 102). Various transforms and correlations can be derived to convert data obtained from the image sensor into appropriate values and measurements (e.g., CIE 1931, CIE L*u*v, CIE L*a*b*, etc.). A reference that explains the principles of such operations is Circles of Confusion by Alan Roberts, available from the European Broadcasting Union, L'Ancienne Route 17A, 1218 Grand-Saconnex/Geneva, Switzerland, herein incorporated by reference.

Image information taken by the image capture device 212 can be used to evaluate scene layout characteristics, object positioning, and lighting fixture positioning. The location and lighting impact of connected lighting fixtures can also be determined by taking "before and after" images with lighting fixtures 101 in various settings. The location and lighting impact can also be determined utilizing various digital imaging techniques including edge detection, blob detection, motion detection, object tracking, and pixel level thresholding methodologies. Based on this positioning data, the system 100 can then perform intelligent functions without user intervention.

Color and brightness data can be utilized in real-time video or static events to characterize dynamic or static lighting scenes. Intelligent choices regarding lighting color and brightness can then be made, while taking into account object positioning, and deployed to connected lighting fixtures and accessories in real-time. Choices include real-time ambient color/brightness matching, fixed color and brightness settings, detection of ambient color characteristics without the impact of the lighting fixtures.

It will be appreciated that the system 100 may be configured to operate in a variety of ways utilizing information passed back and forth between the mobile computing device 102 and the lighting fixtures 101. It should also be understood that the number and position of the mobile computing device 102 and the lighting fixtures 101 in FIG. 1, for example, is only exemplary. A single lighting fixture 101 may be used, or many more than two may be used. Also, due to Bluetooth pairing abilities, other identical or similar systems in the area will not cause interference or degradation of performance. Where other wireless protocols are used, various addressing schemes can be deployed such that each lighting fixture 101 can be separately controlled.

Figure 3:
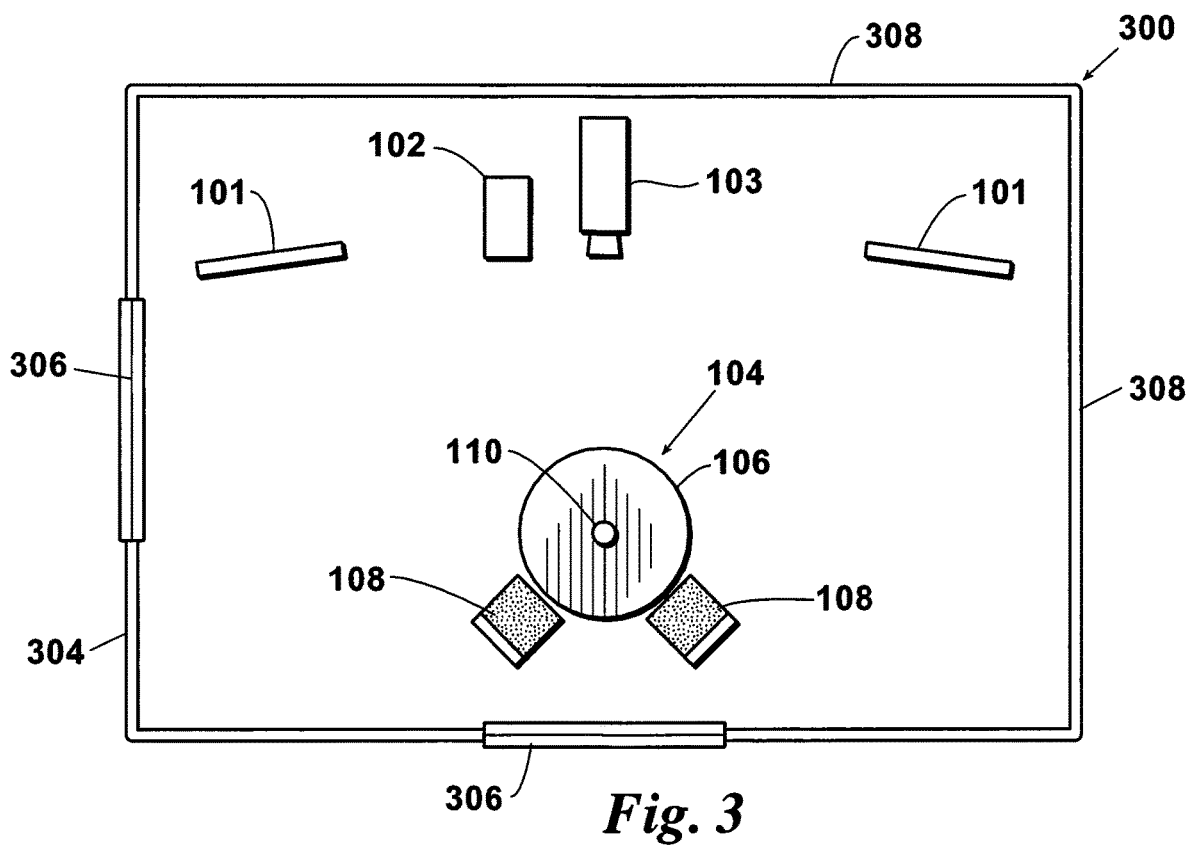
FIG. 3 is an overhead view of one shooting environment deploying an intelligent lighting control system of the present disclosure.

Referring now to FIG. 3, an overhead view of one shooting environment 300 deploying an intelligent lighting control system of the present disclosure is shown. Here, the scene 104 is located inside a room comprising two walls 304 with windows 306 and two walls 308 having no windows. The camera 103 is facing toward one of the windows 304 and perpendicular to the other. The color balance sensed by the camera 103, and that therefore should be matched by the light fixtures 101, can be sensed by the mobile computing device 102 by placing it, for example, near the camera 103. Via wireless communication, the mobile computing device 102 provides the correct color balance of light to be provided by the lighting fixtures 101 to accurately light the scene 104.

Figure 4:
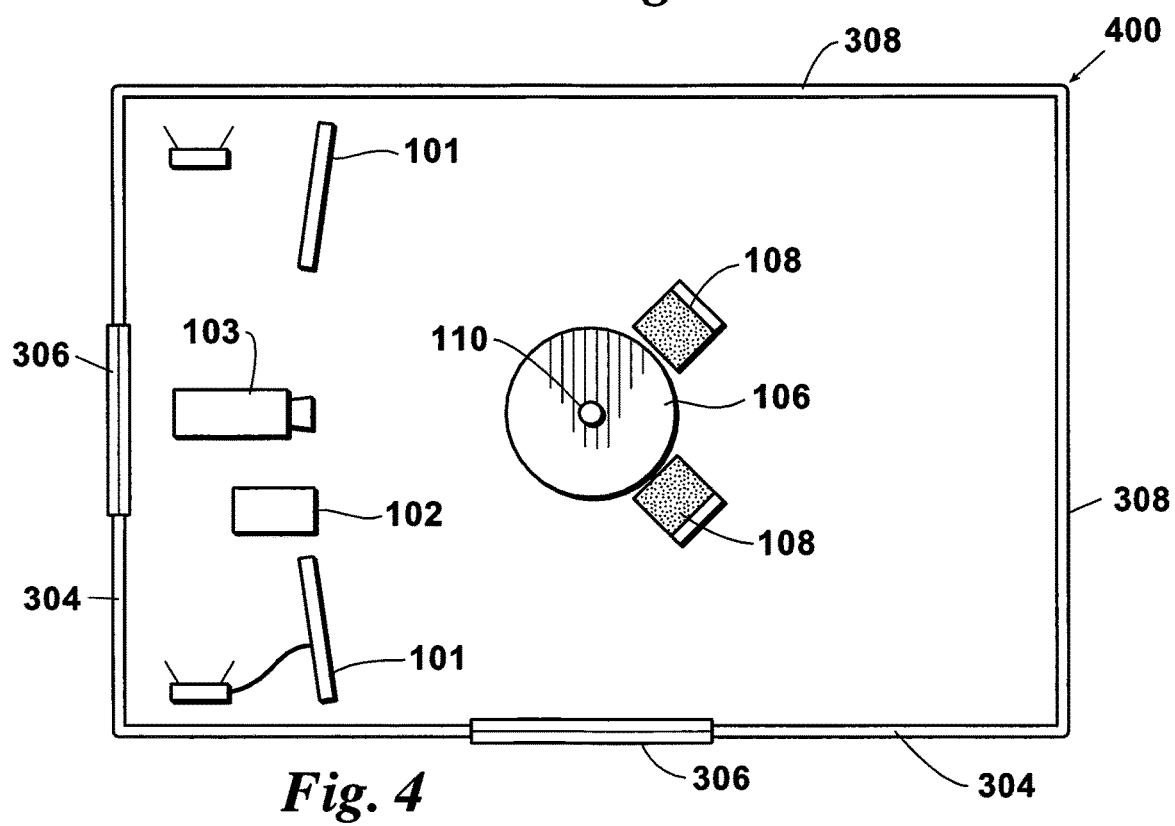
FIG. 4 is another overhead view of a shooting environment deploying an intelligent lighting control system of the present disclosure

Referring now to FIG. 4 is another overhead view of a shooting environment 400 deploying an intelligent lighting control system of the present disclosure is shown. The environment 400 differs from the environment 300 in that the camera 103 now faces away from the window 306 to which it was formerly perpendicular and is now perpendicular to the window 306 it formerly faced. Such a difference can have a substantial impact on the color balance detected at the viewpoint of the camera 103. This change can be detected by the mobile computing device 102 which remains near the camera 103. Accordingly, the mobile computing device 102, in two-way communication with the lighting fixture 101 can alter the color balance of the light provided into the scene 104 by the light fixtures 101.

In the environment 400 of FIG. 4, one light fixture 100 is controlled via Wi-Fi, communicating with the mobile computing device 102 via a Wi-Fi router 402. Another light fixture 101 is controlled via a wireless DMX bridge 404. As previously described, the lighting fixtures 101 can also communicate directly with the mobile computing device 102 by Bluetooth, for example. In some embodiments, all light fixtures 100 are controlled under the same wireless protocol.

Figure 5:
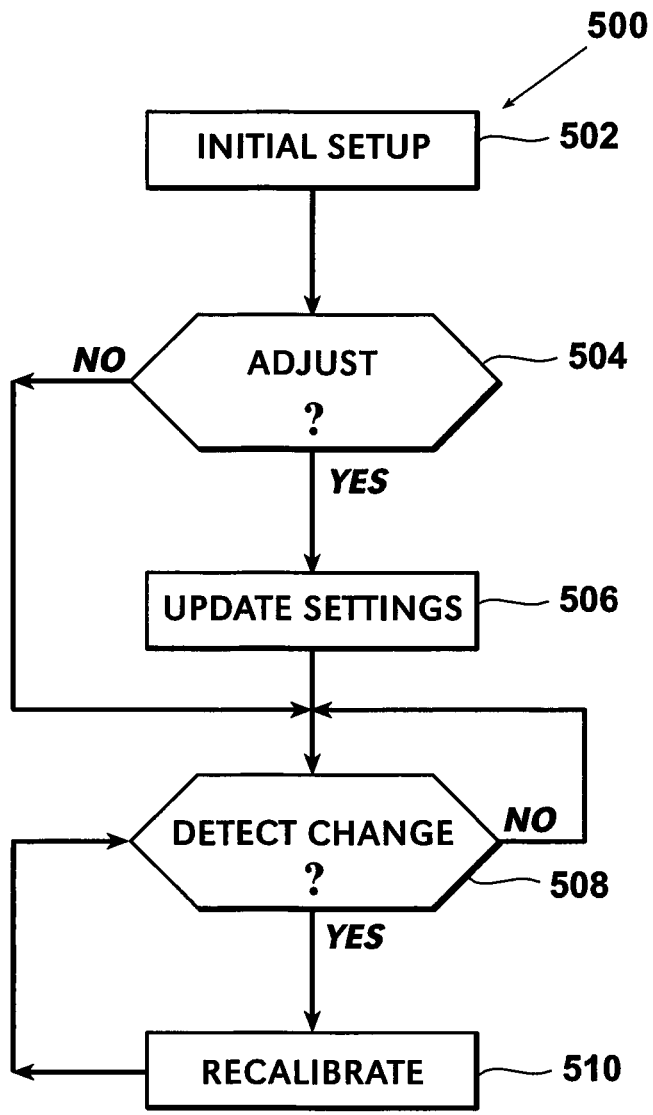
FIG. 5 is a flowchart depicting one embodiment of a control scheme for the intelligent lighting control system of FIG. 1.

It should be appreciated that that the systems of the present disclosure are useful for real-time control of lighting fixtures regardless of how or why the lighting of a scene changes. FIG. 5 is a flowchart depicting one embodiment of a control scheme for the intelligent lighting control systems of the present disclosure. In some embodiments, a base or default set of parameters may be provided in the mobile computing device 102 (e.g., a target color and brightness). When the system is activated, initial setup may occur as shown at step 502. It should be understood that step 202 may actually involve the light sensor of the mobile computing device taking a series of readings (or a single continuous reading) that is used to adjust the lighting fixtures in order to bring about the desired color and brightness as detected by the mobile computing device. In this respect, the real-time feedback loop begins at step 502.

Rather than the default setting (which could also be the last used settings) the user may prefer to adjust the lights. This decision is shown logically at step 504. A setting update step 506 may be executed wherein the user can manually enter desired settings, or select from a number of predetermined settings. If changed settings are implemented, the mobile computing device 102 will alter the output of the light fixtures 101 based on feedback from the image capture device 212 until the selected parameters or conditions are achieved.

As described above, the system 100 may continuously, and in real-time, monitor information from the image capture device. This information may be transformed to information normally available from a light sensor. If the system 100 (via a processor 206 in the mobile computing device 102) determines that the output from the lighting fixtures 101 no longer produces the desired color and intensity, adjustments to the lighting fixtures may be made by the mobile device utilizing Bluetooth or another wireless communication protocol. The operation is shown logically by the loop at step 504. If no changes are detected, no alterations in the outputs of the lighting fixtures are needed. Of course, a user can always override such a condition (but this is not shown, for simplicity).

It should be understood that lighting conditions may change for a number of reasons. For example, a subject or other part of the scenery (104, FIG. 1) may change. Difference in colors and reflective properties of objects being captured via photo or video will also the color and light level being captured at the scene. Ambient or adjacent light sources may also change. The system 100 automatically adjusts for such changes, without input needed from the user, to insure the selected parameters are maintained. The automatic adjustment mechanism is shown at step 510. Again, this may involve an adjustment based on feedback from the image sensor of the mobile computing device.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A system comprising:
   a mobile computing device having a communicatively coupled image sensor; and
   at least one lighting fixture electronically controlled by the mobile computing device;
   wherein the mobile computing device continuously and in real time alters color output of the at least one light fixture to match a color balance corresponding to a scene as detected by the image sensor.

2. The system of claim 1, wherein the at least one lighting fixture comprises at least two lighting fixtures and each is separately controllable in real-time by the mobile computing device with regard to at least color output and intensity.

3. The system of claim 1, wherein the mobile computing device controls the at least one lighting fixture wirelessly.

4. The system of claim 1, wherein the at least one lighting fixture comprises a mobile light emitting diode panel.

5. The system of claim 1, wherein the mobile computing device comprises a mobile telephone.

6. A system comprising:
   a mobile computing device comprising:
     an image sensor; and
     a processor communicatively coupled to the image sensor that computes tristimulus values from RGB values obtained from the image sensor; and
   a lighting fixture capable of producing a specified intensity and color of light;
   wherein the processor specifies in real-time a color of light to be emitted by the lighting fixture to match the computed tristimulus values.

7. The system of claim 6, wherein the mobile computing device and the lighting fixture are in wireless communication for specification of the color of light to be emitted.

8. The system of claim 7, wherein the processor detects changes in color balance of a scene monitored by the image sensor in real-time.

9. The system of claim 8, wherein the processor updates the color of light to be emitted and transmits the updated color to the lighting fixture in real-time.

10. The system of claim 9, further comprising at least one additional lighting fixture producing a second specified color of light and which is in communication with the mobile computing device for receipt of the second specified color.

11. The system of claim 10, wherein the first and second specified colors differ.

12. The system of claim 11, wherein the lighting fixtures comprise panels of multiple light emitting diodes.

13. The system of claim 12, wherein the mobile computing device comprises a mobile telephone.

14. The system of claim 11, wherein the lighting fixtures comprise Fresnel lights.

15. A method comprising:
    utilizing a mobile computing device having an image sensor to continuously determine a light balance of a scene;
    providing at least one lighting fixture capable of providing a variable color light output to direct output light toward the scene; and
    instructing the at least one lighting fixture to provide in real time and as necessary a specified color of light corresponding to the light balance of the scene.

16. The method of claim 15, further comprising instructing at least one additional lighting fixture to provide a second specified color of light.

17. The method of claim 15, further comprising instructing the at least one lighting fixture wirelessly.

* * * * *